US011873759B2

(12) United States Patent
Braun et al.

(10) Patent No.: US 11,873,759 B2
(45) Date of Patent: Jan. 16, 2024

(54) PRESSURIZATION OF EXHAUST GASES FROM A TURBINE POWER PLANT

(71) Applicant: Voith Patent GmbH, Heidenheim (DE)

(72) Inventors: Josef Braun, Crailsheim (DE); Hans Schirle, Stimpfach (DE)

(73) Assignee: Voith Patent GmbH, Heidenheim (DE)

( * ) Notice: Subject to any disclaimer, the term of this patent is extended or adjusted under 35 U.S.C. 154(b) by 8 days.

(21) Appl. No.: 17/549,353

(22) Filed: Dec. 13, 2021

(65) Prior Publication Data

US 2022/0106909 A1 Apr. 7, 2022

Related U.S. Application Data

(63) Continuation of application No. PCT/EP2020/065757, filed on Jun. 8, 2020.

(30) Foreign Application Priority Data

Jun. 13, 2019 (DE) ...................... 10 2019 116 065.0

(51) Int. Cl.
*F02C 6/08* (2006.01)
*F01D 15/10* (2006.01)
(Continued)

(52) U.S. Cl.
CPC ................ *F02C 6/08* (2013.01); *F01D 15/10* (2013.01); *F02C 3/34* (2013.01); *F02C 7/36* (2013.01);
(Continued)

(58) Field of Classification Search
CPC ...... F02C 6/08; F02C 3/34; F02C 3/04; F02C 3/107; F02C 3/113; F02C 7/36; F01D 15/10; F05D 2220/72; F05D 2220/76; F05D 2260/40311; F05D 2260/406; F05D 2270/3013
See application file for complete search history.

(56) References Cited

U.S. PATENT DOCUMENTS 2,176,105 A * 10/1939 Schneider ............... F16H 47/08
60/341
6,263,661 B1 * 7/2001 van der Burgt .......... F02C 7/08
60/39.17
(Continued)

FOREIGN PATENT DOCUMENTS

DE 10 2016 206 750 A1 11/2016
WO 2012/003076 A1 1/2012

OTHER PUBLICATIONS

German Office Action dated Jan. 14, 2020 for German Application No. 10 2019 116 065.0 (12 pages).
(Continued)

*Primary Examiner* — Steven M Sutherland
(74) *Attorney, Agent, or Firm* — Taylor IP, P.C.

(57) ABSTRACT

A method for pressurizing exhaust gases from a turbine power plant includes the steps of: applying a pressure to at least a proportion, in particular a proportion rich in carbon dioxide, of the exhaust gases from the power plant by way of a fluid operating machine of a pressurization device, and applying a torque to the fluid operating machine and/or driving the fluid operating machine by way of such a torque, which is present at an output shaft of a main turbine of the power plant.

15 Claims, 4 Drawing Sheets

(51) Int. Cl.
   *F02C 3/34* (2006.01)
   *F02C 7/36* (2006.01)
(52) U.S. Cl.
   CPC ...... *F05D 2220/72* (2013.01); *F05D 2220/76* (2013.01); *F05D 2260/406* (2013.01); *F05D 2260/40311* (2013.01); *F05D 2270/3013* (2013.01)

(56) References Cited

U.S. PATENT DOCUMENTS

| | | |
|---|---|---|
| 9,876,412 B2 * | 1/2018 | Santini ..................... F02C 7/36 |
| 2009/0054191 A1 | 2/2009 | Holt et al. |
| 2011/0304155 A1 | 12/2011 | Hoffmann et al. |
| 2014/0056687 A1 | 2/2014 | Younes et al. |
| 2014/0216034 A1 | 8/2014 | Numata et al. |

OTHER PUBLICATIONS

Notification of the Transmission of the International Search Report and Written Opinion of the International Search Authority or Declaration dated Aug. 25, 2020 for International Application No. PCT/EP2020/065757 (13 pages).

* cited by examiner

Detail I – I
Detail II – II

Detail I – I
Detail II – II

Detail I – I
Detail II – II

Detail I – I
Detail II – II

Detail I – I
Detail II – II

PRESSURIZATION OF EXHAUST GASES FROM A TURBINE POWER PLANT

CROSS REFERENCE TO RELATED APPLICATIONS

This is a continuation of PCT application No. PCT/EP2020/065757, entitled "PRESSURISATION OF EXHAUST GASES FROM A TURBINE POWER PLANT", filed Jun. 8, 2020, which is incorporated herein by reference.

BACKGROUND OF THE INVENTION

1. Field of the Invention

The present invention relates to a pressurization device for exhaust gases of a turbine power plant, a turbine power plant with such a pressurization device, and a method for pressurization of exhaust gases in a turbine power plant.

2. Description of the Related Art

Carbon capture and/or storage (CCS) can be used to reduce or even eliminate the emission of greenhouse gases into the atmosphere from power plants that burn fossil fuels. This applies both to gas turbine power plants, in which the turbine blades are directly exposed to the combustion gases, and to steam turbine power plants, in which a steam cycle is operated with thermal energy from the combustion of the fuel and the turbine blades are exposed to the heated steam.

In addition to CCS processes in which the carbon dioxide is separated prior to combustion of the fuel (pre-combustion), a common method is the separation of the carbon dioxide after combustion (post-combustion) from the exhaust gases of the combustion. The exhaust gas can herein either be compressed first and the carbon dioxide be eliminated subsequently, or the carbon dioxide can be eliminated first and be compressed subsequently. The CCS process requires a very powerful compressor in both cases.

In known power plants that have devices for post-combustion CCS the required compressor is operated with an electric motor, which must be supplied with electric power in accordance with the required compressor capacity. For this purpose, for example, part of the electric energy harnessed by the power plant can be directed to the compressor drive.

Such an arrangement permits flexible control of the compressor performance according to the current development of the compression demand in the plant. The disadvantage, however, is the poor efficiency of the power transfer from the turbine to the compressor due to the losses in the transformations of torque at the turbine output shaft into electric energy and back into torque at the compressor.

In gas turbine power plants with pre-combustion CCS it is known that the compressor for the combustion air and the gas turbine expander share a drive shaft.

A common drive shaft is known from WO 2012/003076 A1 also for compression of cooled recycling gas by way of a first compressor, even though according to the level of knowledge of the applicant such a configuration—due to the disadvantages associated therewith—are not currently used in power plants. With a common drive shaft the compressor performance cannot be adjusted independently of the turbine performance.

From publication US 2014/0216034 A1 a drive train is moreover known to operate a power plant not with steam but with $CO_2$. Here, the compressor that feeds the $CO_2$ into the process is driven by a turbine or the electric motor, with a coupling being provided between the compressor and the turbine on the one hand and the compressor and electric motor on the other for the switching process between the two modes of operation.

Against this background, what is needed in the art is to improve pressurization for exhaust gases in a turbine power plant and to also optimize its operation.

SUMMARY OF THE INVENTION

The present invention provides a pressurization device for exhaust gases from a turbine power plant, wherein the pressurization device includes at least one fluid operating machine which is designed for the compression of gaseous components of the exhaust gases and/or for pressurization of liquid components in the exhaust gases, the fluid operating machine including one drive shaft which—for the purpose of transferring torque—is designed to be connected with an output shaft of a main turbine of the power plant, the pressurization device including a power transmission element, connected to the drive shaft of the fluid operating machine and having at least one hydrodynamic transmission element, which can be connected to the output shaft of the main turbine. The present invention further provides a turbine power plant, including at least one turbine having an output shaft, and one generator connected to the output shaft for transmitting torque and designed to convert torque applied to the output shaft into electrical energy, the output shaft of the turbine being adapted to be coupled to an input shaft of the pressurization device. The present invention further provides a method for pressurization of exhaust gases from a turbine power plant, the method including the steps of: pressurizing at least a partial volume—in particular, a partial volume rich in carbon dioxide—of the exhaust gases of the power plant by way of the fluid operating machine of the pressurization device, and pressurizing and/or driving of the fluid operating machine with a torque applied to the output shaft of a main turbine of the power plant, by way of a connection and/or coupling of the output shaft with the input shaft of the fluid operating machine.

According to a first aspect of the invention, a pressurization device is provided for exhaust gases in a turbine power plant. Exhaust gases that are pressurized are, in particular, carbon dioxide-containing exhaust gases and/or a carbon dioxide-rich partial volume of the exhaust gases (for example, after other components of the exhaust gases, for example, nitrogen and/or others) have been separated with a suitable separation process.

A turbine, in particular a main turbine, of the power plant can be driven directly or indirectly by a fluid which is heated and/or pressurized to operate the turbine, in particular by way of a combustion process.

The pressurization device has at least one fluid operating machine in particular a compressor and/or a pump, wherein the compressor may in addition also be designed as a pump, or the pump may in addition also be designed as a compressor. Depending upon whether the fluid operating machine is designed as a compressor and/or as a pump, it is arranged for the compression of gaseous components in the exhaust gases and/or for pressurization of liquid components in the exhaust gases which result in particular from the combustion process of the fuel for indirect or direct drive of the turbine.

The fluid operating machine is in particular connectable, in particular connected directly and/or indirectly, with an output shaft of a primary turbine of the power plant for transfer of torque and is drivable, in particular driven by a torque that is transmitted by the output shaft.

According to the invention, the pressurization device includes a power transmission element connected to the drive shaft of the fluid power machine and having at least one hydrodynamic transmission element, which can be connected to the output shaft of the main turbine. Use of a hydrodynamic transmission element in the connection between the output shaft of the primary turbine and the fluid power machine offers the advantage of a smooth and slow start of the fluid power machine and a vibration-damping and wear-free power transfer. The hydrodynamic transmission element also facilitates the start of a very large mass moment of inertia. Compared to a mechanical disconnect coupling, it is possible to engage and disengage the fluid operating machine under load while the main turbine continues to run, i.e. the fluid operating machine can be engaged or disengaged while the main turbine continues to operate. Due to the thereby provided fast possibility of disconnection, a simple overload protection is possible.

The drive via the main turbine eliminates the need for a separate drive unit for the fluid operating machine, and the power output of the fluid operating machine for compressing the gas produced at the main turbine can be directly adjusted by coupling it to the main turbine via the hydrodynamic transmission element.

According to a second aspect the pressurization device is part of the turbine power plant. The turbine power plant includes at least:
  a) a turbine, in particular a main turbine having an output shaft and in particular at least one blade ring which is arranged circumferentially around the output shaft and has a plurality of turbine blades which can be driven directly or indirectly with a fluid, which is heated and/or pressurized—in particular by way of a combustion process—to act on the turbine blades with a torque,
  b) a generator which, for the transmission of torque is connected with the output shaft and which is designed in particular for converting of a torque on the output shaft into electric energy.

The turbine output shaft is designed to be coupled with an input shaft of a pressurization device according to one embodiment of the present invention.

According to one design, c) a pressurization device according to one embodiment of the present invention is part of the turbine power plant, wherein then in particular the output shaft of the turbine and the drive shaft of the pressurization device are designed to be coupled to the respective other for torque transmission.

According to one design the turbine power plant has d) an exhaust gas path which is designed to direct combustion exhaust gases from a combustion chamber of the turbine power plant to an inlet of the pressurization device. According to one embodiment, an aftertreatment of the exhaust gas, for example in the sense of a carbon dioxide separation and/or a cooling of the exhaust gas and/or a heating of the exhaust gas and/or an expansion of the exhaust gas and/or a compression of the exhaust gas, can be provided along the exhaust gas path. Thereby, for example, the exhaust gas can be compressed first and then carbon dioxide separated, or carbon dioxide can be separated first and then compressed.

According to a third aspect a method for pressurization of exhaust gases in a turbine power plant is provided. The method includes at least the following process steps which can be implemented according to the specified sequence or in any other useful sequence:

i) Pressurizing at least a partial volume—in particular a partial volume rich in carbon dioxide—of the exhaust gases of the power plant by way of a fluid operating machine of a pressurization device which is designed in particular according to one embodiment of the present invention; according to one embodiment, all exhaust gases are pressurized.
  ii) Pressurizing and/or driving of the fluid operating machine with a torque applied to an output shaft of a main turbine of the power plant, in particular directly and/or indirectly, by way of a connection and/or coupling of the output shaft with an input shaft of the fluid machine; a coupling in the present case is to be understood in particular as a releasable connection which is rotationally fixed in the non-released state.

The invention is also based, inter alia, on the consideration that in known steam power plants with post-combustion CCS the exhaust gas compressor is generally operated electrically which entails considerable transformation losses. At the same time, the approach practiced with pre-combustion CCS to place an air compressor on the output shaft of the main turbine is not expedient for the exhaust gas compression, because the required compression performance and the performance provided by the main turbine are not directly proportional relative to each other in all operating instances. Examples cited herein are the start-up phase of the power plant or the time delay during steam generation in steam turbine power plants.

The invention is based, inter alia, on the idea of coupling steam turbine sets, which are frequently installed as a unit, to the exhaust gas compressor for torque transmission in such a way that the compressor output can be provided without transformation losses on the one hand, but on the other hand in a controllable or regulatable manner, and at least partially, in particular completely, independently of the respective output of the main turbine.

According to the invention, the output shaft of the turbine on the one hand and the drive shaft of the compressor on the other hand are designed to be connected to one another for torque transmission. In particular, a suitable power transmission element is therefore provided between the two shafts.

The inventive concept is not only applicable to steam turbine power plants, but also to gas turbine power plants and other turbine power plants. Moreover, the inventive concept relates not only to systems in which carbon dioxide is to be compressed, but also to systems in which already compressed carbon dioxide is to be pumped.

With the present invention, the required drive energy for the pressurization device can be taken directly mechanically from the turbine generator set. This makes it possible to achieve a high degree of efficiency—especially compared with an electric drive for the pressurization device—because the direct drive means that no further electrical transmission elements are required.

The pressurization device can be switched on or off as required while the steam turbine generator set continues to run, in particular when a releasable and/or optionally controllable power transmission element is used.

According to one embodiment, the fluid operating machine has a drive shaft designed to be coupled with the output shaft of the main turbine for torque transmission. As a result, a releasable torque transmission is possible from the output shaft of the turbine to the drive of the pressurization device.

In order to save space, the drive shaft of the fluid operating machine can be arranged coaxially relative to an output shaft of the main turbine according to one embodiment. For this purpose, coaxial power transfer elements, for example friction clutches, hydrodynamic couplings, torque converters and/or planetary gears, but also other suitable combinations of transmission stages can be used.

According to one embodiment, the drive shaft of the fluid operating machine is additionally designed as an output shaft of the main turbine, or can be firmly linked with same, in particular if it is not necessary for a specific application to regulate the pressurization device independently of the output shaft of the turbine.

In order to enable an adjustment of the power and/or the speed of the pressurization device, according to one embodiment, the pressurization device includes a power transmission element, in particular a clutch and/or a gear, connected to the drive shaft of the fluid operating machine, which is connectable, in particular connected to the output shaft of the main turbine.

Depending on the specific requirement of the coupling of the output shaft of the turbine on the one hand and the drive shaft of the pressurization device on the other hand (for example in regard to speed and/or pressurization power) the following power transfer elements can be advantageously used, in particular: (1) torque converter with through-connection (for example as used in applicant's product line Vosycon) and/or (2) hydrodynamic couplings (with or without through-connection) (3) and these in combination with mechanical transmission stages and/or (4) planetary gears (for example as used in applicant's product line Vorecon, for example with starting clutch). The advantageous effect on further developments of the present invention for various of these elements or respectively combinations thereof is described below for different embodiments.

To enable, for example, decoupling of the pressurization device from the turbine when starting the power plant, the power transmission element has—according to one embodiment—at least one hydrodynamic transmission element.

In particular, the hydrodynamic transmission element has a torque converter and/or a hydrodynamic coupling, in particular, if necessary, each with a lock-up clutch, i.e. with a possibility for through-connection. With a hydrodynamic coupling, the rotational output speed at the drive shaft of the pressurization device can be influenced by adjusting the degree of filling with an operating oil. With a torque converter the rotational output speed at the drive shaft and thus the compression and/or pump capacity of the pressurization device can be influenced. With a lock-up clutch possible losses from the hydrodynamic coupling of the two shafts can be minimized or avoided.

In particular for continuously variable control of the speed and/or for the possibility of decoupling of the pressurization device from the output shaft of the turbine, the hydrodynamic transmission element according to one embodiment has in particular a continuously variable controllable fill level with an operating oil.

In particular, in order to enable a large rotational speed difference between a rotational speed of the output shaft to the turbine on the one hand and a desired rotational speed of the drive shaft of the pressurization device on the other hand, the power transmission element according to one embodiment has at least one mechanical transmission stage. In particular, the mechanical transmission stage includes a spur gear stage and/or a bevel gear stage and/or a planetary gear, the implementation of the gear combination for the realization of a certain transmission ratio or reduction ratio being at the discretion of experts.

An additional advantage of using a hydrodynamic transmission element is that decoupling of the working machine can occur even with continued operation of the main turbine, wherein an overload protection can also be utilized.

According to one embodiment the turbine, in particular the main turbine of the turbine power plant is designed as a steam turbine. The (steam turbine) power plant is then arranged for combustion of a fuel which, during combustion heats and/or pressurizes a liquid, in particular water which serves as the drive fluid for the turbine. In this embodiment, the power plant has a pressurization device according to one embodiment of the invention, which is designed to pressurize, in particular compress exhaust gases—in particular carbon dioxide—from the combustion of the fuel so that at least a part of the exhaust gases are transferred into a liquid condition.

According to one embodiment of the turbine, in particular the main turbine of the turbine power plant, the turbine is designed as a gas turbine. The (gas turbine) power plant is then arranged for combustion of a fuel, in particular a gaseous fuel which, during and/or after combustion serves as the drive fluid for the turbine.

In this embodiment, the power plant has a pressurization device according to one embodiment of the invention, which is designed to pressurize, in particular compress exhaust gases—in particular carbon dioxide—from the combustion of the fuel so that at least a part of the exhaust gases are transferred into a liquid condition.

The possibility of producing and/or decoupling of the torque transfer is used for example, if, according to one embodiment the connection between the output shaft and the fluid machine is released for starting of the power plant and/or is established on reaching a predetermined closing criterion, such as in particular a minimum rotational speed of the output shaft and/or a minimum torque on the output shaft.

In order to enable a flexible use of the pressurization device, according to one embodiment, a rotational speed of the fluid operating machine and/or of a drive shaft of the fluid operating machine is adapted, in particular during operation, to a fluid working demand, in particular to a compression and/or pumping demand, of the pressurization device, in particular by way of at least one power transmission element, such as, for example, at least one clutch and/or at least one gear element and/or at least one transmission stage.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
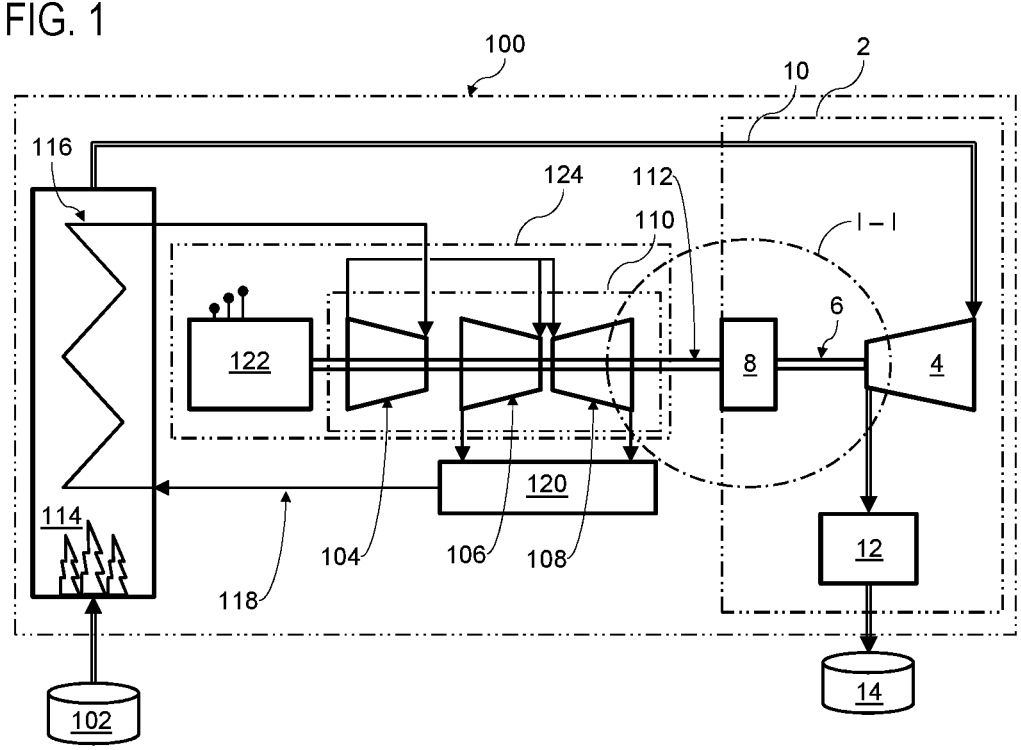
FIG. 1 is a schematic view of a steam turbine power plant with a pressurization device according to an exemplary embodiment of the invention.

The design example in FIG. 1 shows schematically a turbine power plant 100 in the embodiment of a steam turbine power plant. Steam turbine power plant 100 is designed for the combustion of a gaseous fuel, for example natural gas or methane in a combustion chamber 114, wherein the fuel can for example be supplied from a tank 102. A heat exchanger 116 of a steam circuit 118 is arranged in combustion chamber 114, wherein the combustion heat of the fuel is used to heat and/or to pressurize water into steam circuit 118.

Steam turbine power plant 100 has a steam turbine 110 with one high-pressure steam expander 104 and two low-pressure steam expanders 106 and 108, at which the steam charged with the combustion heat can relax and thereby cause the expanders to rotate. After expansion of the steam, it collects in a condenser 120. From condenser 120, water can again be supplied to heat exchanger 116 for evaporation.

Expanders 104, 106, 108 together, form steam turbine 110 and are designed to drive a common output shaft 112, in particular by way of the expansion of the steam at the expanders.

Output shaft 112 is connected with a generator 122 for the transmission of torque. Generator 122 is designed to convert the torque applied to output shaft 112 into electric energy. Steam turbine 110 and generator 122 can for example be provided in an integrated arrangement as a generator-turbine unit 124 (also referred to as generator-turbine set).

In addition, power plant 100 has a pressurization device 2 for exhaust gases from combustion chamber 114, wherein pressurization device 2 includes at least one (in the design example) fluid operating machine 4, designed as a compressor for compressing gaseous components of the exhaust gases from combustion chamber 114.

Fluid operating machine 4 has an input shaft 6 designed to be coupled (i.e., connected) to output shaft 112 of steam turbine 110 for torque transmission by way of a power transmission element 8.

Fluid operating machine 4 may, in operation, compress (and thereby liquify, if necessary) exhaust gases supplied from an exhaust conduit 10 and supply them to a device 12 for separating carbon dioxide from the compressed exhaust gases. The separated carbon dioxide can then be injected into a suitable storage facility 14, for example, in particular by way of a CCS process.

By coupling output shaft 112 and input shaft 6 by way of a power transmission element 8, a compressor power required for a CCS process can be applied without transformation losses and additionally without a proportional dependence of the compressor power on the turbine power.

Figure 2:
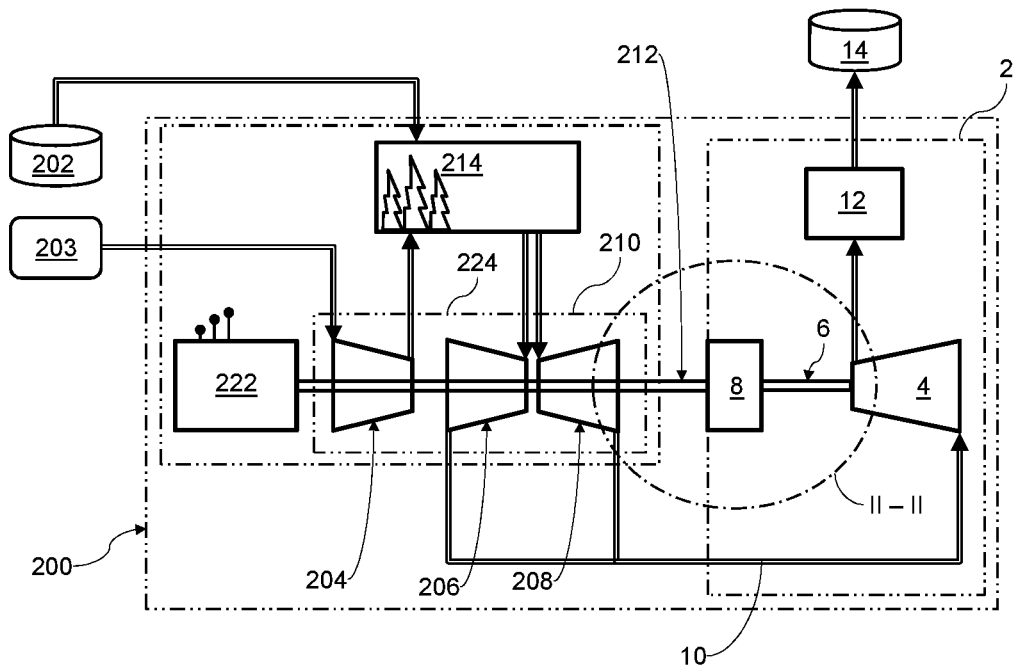
FIG. 2 is a schematic view of a gas turbine power plant with a pressurization device according to an exemplary embodiment of the invention.

FIG. 2 schematically illustrates a turbine power plant 200, which differs from power plant 100 according to FIG. 1 especially in that it is designed as a gas turbine power plant. Thus, the driving power is not applied indirectly via a steam circuit; rather, gas turbine 210 is acted upon directly by the combustion exhaust gases from the combustion of the fuel.

For this purpose, gas turbine 210 has an air compressor 204 for compressing air, for example ambient air 203, whereby the fuel can be fed, for example from a tank 202, into a combustion chamber 214, in particular can be injected or injected under pressure. The compressed air is also fed to combustion chamber 214, so that the resulting compressed mixture in combustion chamber 214 combusts and can be fed to two expanders 206 and 208 of gas turbine 210.

The two expanders 206 and 208 are connected in a rotationally fixed manner to an output shaft 212 of gas turbine 210, which can drive a generator 222. The arrangement of gas turbine 210 and generator 222 can for example take the form of an integrated generator-turbine unit 224.

Power plant 200 also includes a pressurization device 2 for exhaust gases. In the design example, pressurization device 2 does not differ from pressurization device 2 according to FIG. 1. Only the exhaust gases are fed from outlets of expanders 206, 208 into an exhaust duct 10 instead of from combustion chamber 114.

In the design example shown in FIG. 2 fluid power machine 4 has a drive shaft 6. The latter is designed to be coupled (that is, connected) with output shaft 212 of steam turbine 210 for torque transmission by way of a power transfer element 8.

By using different power transfer elements 8, different additional advantages can be realized according to different embodiments of the invention. Relevant design examples are illustrated in FIGS. 3 to 7, described below. The therein illustrated advantageously utilized power transfer elements 8 can be used respectively, independent of whether they are used in a steam turbine power plant 100 according to FIG. 1 or in a gas turbine power plant 200 according to FIG. 2. Accordingly, FIGS. 3 to 7 are to be understood, that they can represent detail I-I of FIG. 1 as well as detail II-II of FIG. 2.

Figure 3:
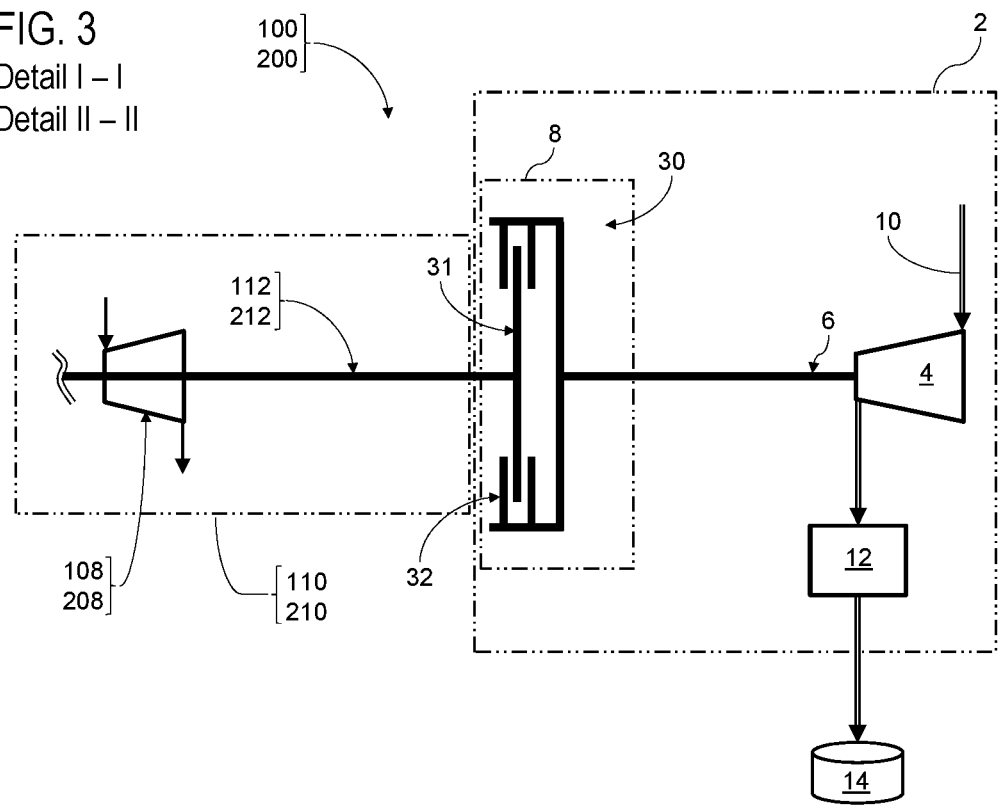
FIG. 3 is a schematic detail of a friction clutch as the power transfer element for a pressurization device according to an exemplary embodiment of the invention, in a power plant according to FIG. 1 or in a power plant according to FIG. 2.

In the design example in FIG. 3, power transfer element 8 is designed as a simple friction clutch 30, if necessary, with sufficient, non-illustrated liquid cooling. Friction clutch 30 has a clutch disk 31 as well as a locking element 32.

For example, for starting turbine power plant 100 or 200, locking element 32 can be switched to an open position so that input shaft 6 of fluid power machine 4 remains decoupled from the torque of output shaft 112 or 212 of the power plant. This allows power plant 100 or 200 to ramp up quickly without having to pull the fluid operating machine 4 along during ramp-up.

When a closing criterion is reached, in this case an operating speed of output shaft 112, 212, closing element 32 can be switched to a closed position so that the torque of output shaft 112, 212 is applied to input shaft 6 of fluid power machine 4.

In the design example in FIG. 3, a partially closed position of closing element 32 may be provided, so that drive shaft 6 rotates with a certain slip relative to output shaft 112 or 212. In this manner, a speed variation of drive shaft 6 can be achieved and thus the compressor capacity can be adjusted in a certain rotational speed range.

Figure 4:
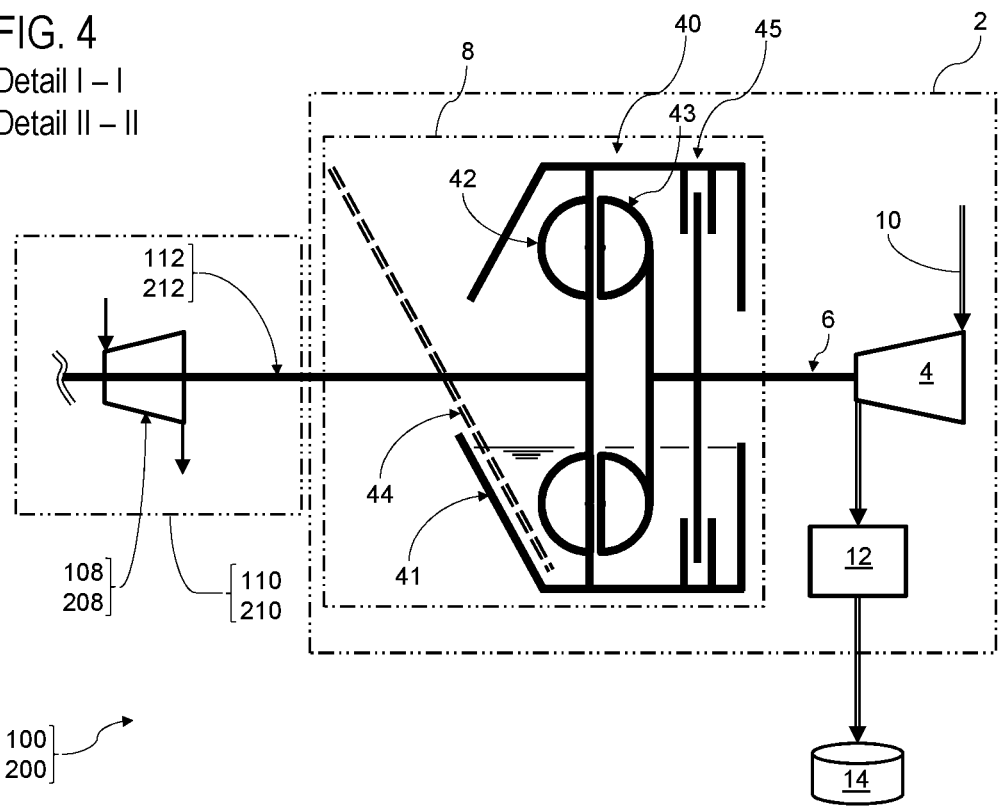
FIG. 4 is a schematic detail of a hydrodynamic coupling as the power transfer element for a pressurization device according to an exemplary embodiment of the invention, in a power plant according to FIG. 1 or in a power plant according to FIG. 2.

In the design example in FIG. 4, power transfer element 8 is designed as a hydrodynamic coupling 40. Hydrodynamic coupling 40 has a housing 41, filled with an operating oil. By way of the operating oil, torque can be transmitted from a pump wheel 42, which is connected to output shaft 112 or 212 in a rotationally fixed manner, to a turbine wheel 43, which is connected to input shaft 6 in a rotationally fixed manner.

The speed ratio between output shaft 112 or 212 and drive shaft 6, can on the one hand be controlled inter alia by the fill level of the housing with the operating oil. The higher the operating oil level, the higher the speed of drive shaft 6. The operating oil fill level may for example, be adjusted by way of an adjustable pitot tube 44.

An identical speed of shafts 112 and 212 on the one hand and 6 on the other hand can be achieved by way of a lock-up clutch 55 for mechanically engaging hydrodynamic coupling 40.

Figure 5:
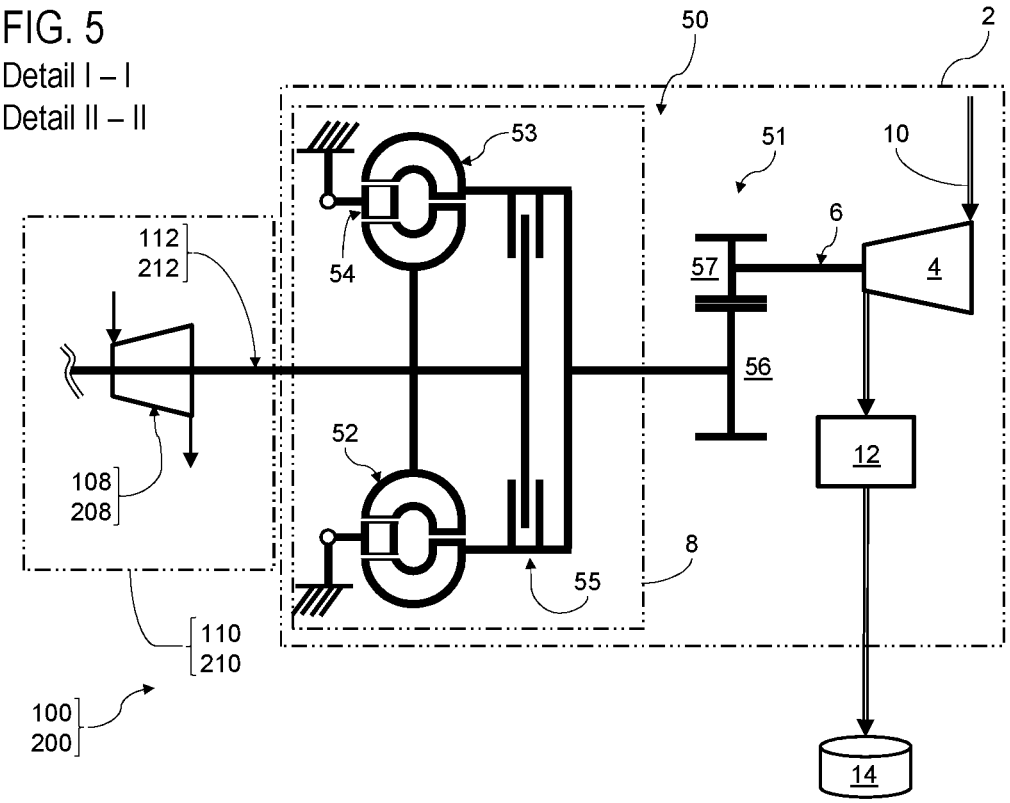
FIG. 5 is a schematic detail of a torque converter with a spur gear stage as the power transfer element for a pressurization device according to an exemplary embodiment of the invention, in a power plant according to FIG. 1 or in a power plant according to FIG. 2.

In the design example in FIG. 5, power transfer element 8 has an in-series connected hydrodynamic torque converter 50 and a spur gear stage 51.

In addition to a pump wheel 52 and a turbine wheel 53, hydrodynamic torque converter 50 has guide blades 54. Depending on the setting of guide blades 54, turbine wheel 53 is energized slower or faster by an operating oil, so that the transmitted speed can be varied in this way. In this way, the available compressor output of fluid operating machine 4 can be continuously adjusted within a certain speed range.

Hydrodynamic torque converter 50 also has a lock-up clutch 55 by way of which shafts 112 or 212 on the one hand and 6 on the other hand can be coupled to one another in a mechanically rotationally fixed manner.

Spur gear stage 51 on the other hand serves to adjust a control speed for the operation of fluid operating machine 4. Depending on the diameter ratio of the two spur gears 56 and 57, the rotational speed at the output side of the torque converter 50 can be stepped up or down, depending on the requirements of the fluid operating machine 4.

Figure 6:
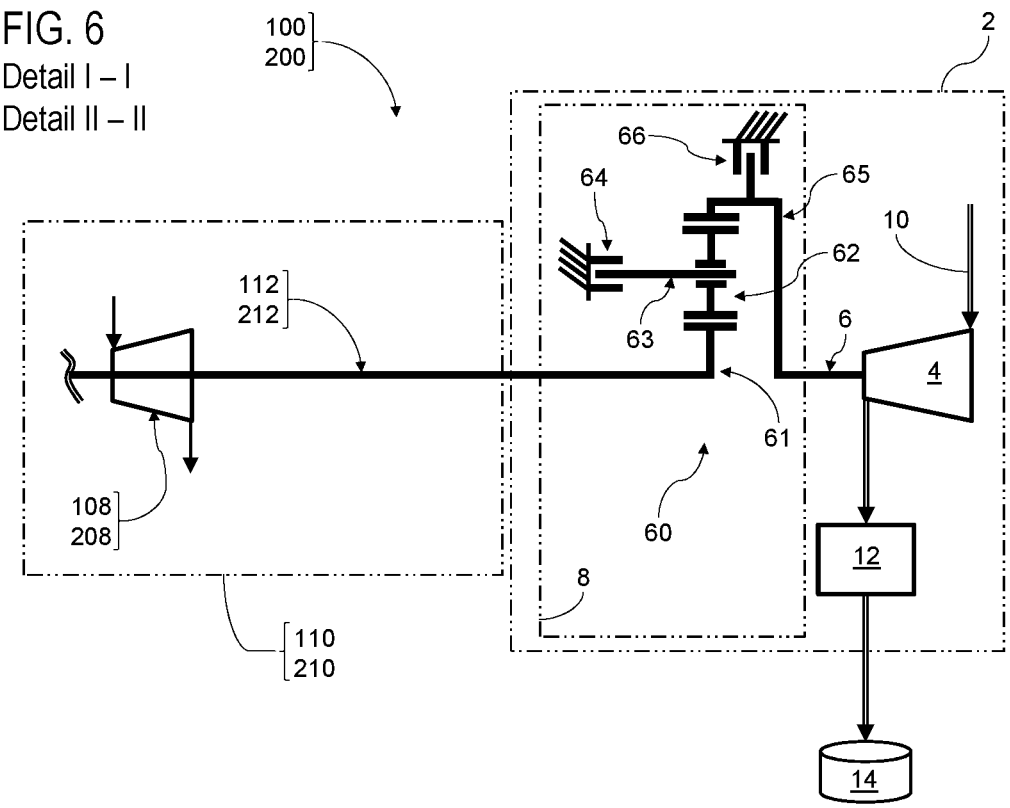
FIG. 6 is a schematic detail view of a planetary gearing as the power transfer element for a pressurization device according to an exemplary embodiment of the invention, in a power plant according to FIG. 1 or in a power plant according to FIG. 2.

In the design example in FIG. 6, power transmission element 8 has a planetary gear, designed as an epicyclic gear 60. Epicyclic gear unit 60 has a sun gear 61 which is connected to output shaft 112 or 212 in a rotationally fixed manner. Planets 62 are arranged around sun gear 61, whereby planet carrier 63 can be released or fixed for rotation by way of a releasable planetary coupling 64. A ring gear 65 is arranged around planets 62, which can be released or fixed for rotation by way of a ring gear coupling 66. The ring gear is connected to drive shaft 6 of fluid power machine 4 in a rotationally fixed manner.

For example, to start power plant 100 or 200, output shaft 112 or 212 can be decoupled from the fluid operating machine by switching hollow gear coupling 66 to a closed state and planetary coupling 64 to an open state. In this way, output shaft 112 or 212 rotates planets 62 without load, while the ring gear and thus input shaft 6 are fixed against rotation.

Once the power plant has been started, hollow gear coupling 66 can be released. Then—in normal operation—at least 2 speed stages for drive shaft 6 and thus for fluid operating machine 4 are switchable via an opening or closing of planetary coupling 64.

Figure 7:
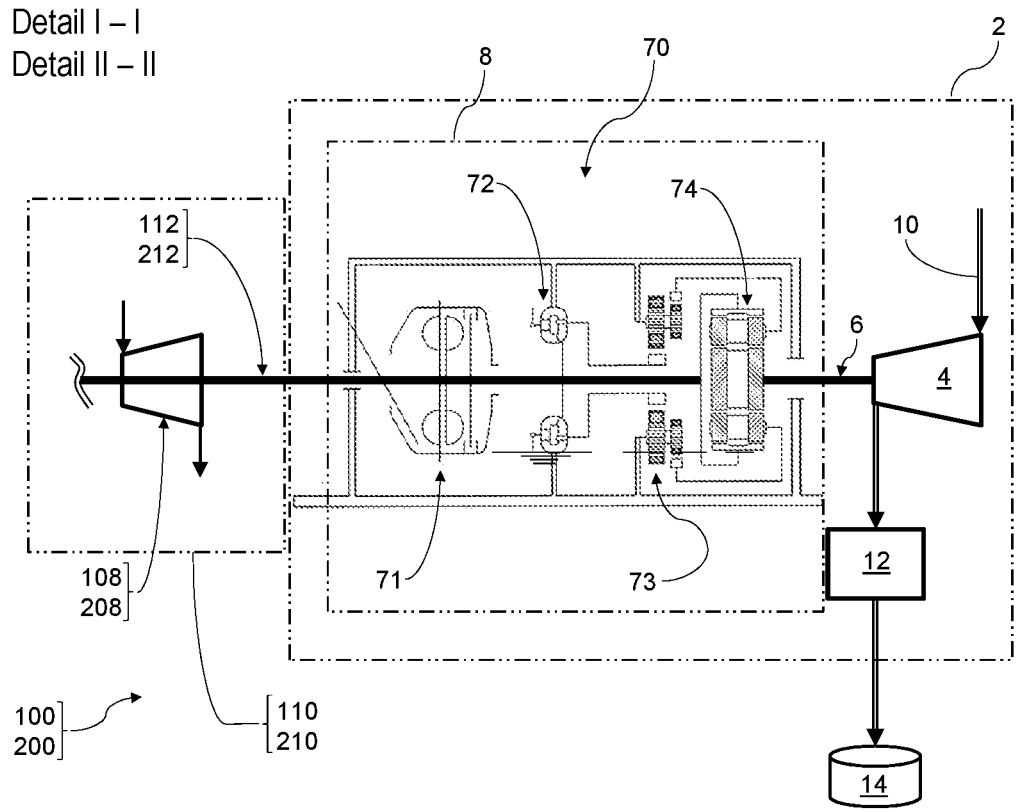
FIG. 7 is a schematic detail view of a series connection of a hydrodynamic coupling, a hydrodynamic torque converter and of planetary gearing as the power transfer element for a pressurization device according to an exemplary embodiment of the invention, in a power plant according to FIG. 1 or in a power plant according to FIG. 2.

In the design example shown in FIG. 7, power transmission element 8 has a combination of several gear elements integrated in a housing to form a variable transmission 70. Such integrated variable transmissions 70 are marketed by the applicant under trade name VORECON©.

In the transmission 70 shown in FIG. 7, a hydrodynamic coupling 71 (for example like coupling 40 in FIG. 4), a hydrodynamic torque converter 72 (for example like converter 50 in FIG. 5), a stationary planetary gear 73 and an epicyclic gear 74 designed as a planetary gear are connected in series.

For example, to start up power plant 100 or 200, hydrodynamic coupling 71 is emptied and its lock-up coupling is opened. Output shaft 112 or 212 on the one hand and input shaft 6 on the other hand are decoupled; the start-up of power plant 100 or 200 can take place almost without load.

Hydrodynamic coupling 71 is filled with operating oil after start-up of power plant 100 or 200 and transmits power. Fluid operating machine 4 accelerates gently to a minimum speed.

Lock-up device then closes and overrides hydrodynamic coupling 71. The speed control of fluid operating machine 4 is then performed by the adjustable guide vanes in torque converter 72.

Output shaft 112 or 212 is connected with the ring gear of epicyclic gear 74. A large part of the input power is thus transmitted directly mechanically and almost loss-free to epicyclic gear 74.

In addition, a hydrodynamic torque converter 72 is connected with output shaft 112 or 212. The pump wheel of the torque converter is connected with output shaft 112 or 212 and diverts a small part of the input power.

An operating oil flow transfers the diverted power from the pump wheel to the turbine wheel of torque converter 72 (hydrodynamic power transfer). The diverted power is transmitted via the turbine wheel to the planet carrier of the planetary gear, whereby stationary planetary gear 73 is provided for the adjustment of a basic rotational speed, in that the planets have a spur gear stage.

The power from the ring gear and the power from the planet carrier add up in epicyclic gear 74. The planetary gears transmit the summed power to the sun gear, to drive shaft 6 and finally to fluid operating machine 4.

Adjustable guide blades in torque converter 72 guide the operating oil flow and determine the rotational speed of the turbine wheel. The speed of the fluid operating machine 4 can thereby be continuously adjusted within a certain rotational speed range.

COMPONENT IDENTIFICATION LISTING

2 Pressurization device
4 fluid power machine
6 drive shaft
8 power transfer element
10 exhaust gas routing
12 carbon-dioxide separation
14 carbon-dioxide
30 friction clutch
31 clutch disk
32 closing element
40 hydrodynamic coupling
41 housing
42 pump wheel 43 turbine wheel
44 pilot tube
45 lock-up coupling
50 hydrodynamic torque converter
51 spur gear stage
52 pump wheel
53 turbine wheel
54 guide blades
55 lock-up coupling
56, 57 spur gears
60 epicyclic gear, in particular planetary gear
61 sun gear
62 planets
63 planet carrier
64 planetary coupling
65 ring gear
66 ring gear coupling
70 variable speed transmission
71 hydrodynamic coupling
72 hydrodynamic torque converter
73 stationary planetary gear
74 epicyclic gear
100 steam turbine power plant
102 fuel tank
104 high pressure steam expander
106, 108 low pressure steam expander
110 steam turbine
112 output shaft
114 combustion chamber
116 heat exchanger
118 steam circuit
120 condenser
122 generator
124 turbine generator unit
200 gas turbine power plant
202 fuel tank
203 ambient air
204 mixture compressor
206, 208 (gas) expander
210 gas turbine
212 output shaft
214 combustion chamber
222 generator
224 turbine generator unit While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pressurization device for a plurality of exhaust gases from a turbine power plant, the pressurization device comprising:
    at least one fluid operating machine which is configured at least one of for compressing a plurality of gaseous components of the plurality of exhaust gases and for pressurizing a plurality of liquid components in the plurality of exhaust gases, the at least one fluid operating machine including one drive shaft which, in order to transfer a torque, is configured for being connected with an output shaft of a main turbine of the turbine power plant; and
    a power transmission element, which is connected to the drive shaft of the at least one fluid operating machine and has at least one hydrodynamic transmission element, which is configured for being connected to the output shaft of the main turbine, the power transmission element including at least one mechanical gear stage.

2. The pressurization device according to claim 1, wherein the drive shaft of the at least one fluid operating machine is configured for being arranged coaxially relative to the output shaft of the main turbine.

3. The pressurization device according to claim 1, wherein the power transmission element has at least one of a coupling and a transmission.

4. The pressurization device according to claim 3, wherein the at least one hydrodynamic transmission element includes at least one of (a) a hydrodynamic torque converter and (b) a hydrodynamic coupling with a lock-up coupling.

5. The pressurization device according to claim 4, wherein the hydrodynamic transmission element includes a continuously variable, controllable degree of filling with an oil.

6. The pressurization device according to claim 1, wherein the mechanical gear stage includes at least one of a spur gear and a planetary gear.

7. The pressurization device according to claim 1, wherein the at least one fluid operating machine is free of a coupling with an additional driving machine.

8. A turbine power plant, comprising:
    at least one turbine having an output shaft;
    at least one generator connected to the output shaft for transmitting a torque and configured for converting the torque applied to the output shaft into an electrical energy
    a pressurization device including an input shaft, the output shaft of the at least one turbine being coupled to the input shaft of the pressurization device, which is for a plurality of exhaust gases from the turbine power plant, the pressurization device further including:
    at least one fluid operating machine which is configured at least one of for compressing a plurality of gaseous components of the plurality of exhaust gases and for pressurizing a plurality of liquid components in the plurality of exhaust gases, the at least one fluid operating machine including one drive shaft, which is the input shaft and which, in order to transfer the torque, is configured for being connected with the output shaft of the at least one turbine, which is a main turbine of the turbine power plant; and
    a power transmission element, which is connected to the input shaft of the at least one fluid operating machine and has at least one hydrodynamic transmission element, which is configured for being connected to the output shaft of the at least one turbine, the power transmission element including at least one mechanical gear stage.

9. The turbine power plant according to claim 8, wherein the at least one turbine is a steam turbine, and the turbine power plant is arranged for a combustion of a fuel, which, during the combustion, at least one of heats and pressurizes the fuel, which is water and which serves as a drive fluid for the at least one turbine, the pressurization device being configured for applying a pressure to, and thereby for compressing, the plurality of exhaust gases from the combustion of the fuel.

10. The turbine power plant according to claim 8, wherein the at least one turbine is a gas turbine, and the turbine power plant is arranged for a combustion of a fuel, which is a gaseous fuel, which, at least one of during and after the combustion, serves as a drive fluid for the at least one turbine, the pressurization device being configured for applying a pressure to, and thereby for compressing, the plurality of exhaust gases from the combustion of the fuel.

11. A method for pressurization of a plurality of exhaust gases from a turbine power plant, the method comprising the steps of:

pressurizing an at least partial volume of the plurality of exhaust gases of the turbine power plant, by way of at least one fluid operating machine of a pressurization device, the pressurization device including:

the at least one fluid operating machine which is configured at least one of for compressing a plurality of gaseous components of the plurality of exhaust gases and for pressurizing a plurality of liquid components in the plurality of exhaust gases, the at least one fluid operating machine including one drive shaft, which is an input shaft and which, in order to transfer torque, is configured for being connected with an output shaft of a main turbine of the turbine power plant; and a power transmission element, which is connected to the drive shaft of the at least one fluid operating machine and has at least one hydrodynamic transmission element, which is configured for being connected to the output shaft of the main turbine, the power transmission element including at least one mechanical gear stage; and at least one of pressurizing and driving of the at least one fluid operating machine with the torque applied to the output shaft of the main turbine of the turbine power plant, by way of a connection and/or a coupling of the output shaft with the input shaft of the at least one fluid operating machine.

12. The method according to claim 11, wherein the at least partial volume is rich in carbon dioxide, the pressurization device being for the plurality of exhaust gases from the turbine power plant.

13. The method according to claim 12, further including the step of connecting the output shaft of the main turbine and the drive shaft of the fluid operating machine by way of the power transmission element.

14. The method according to claim 13, wherein the connection between the output shaft and the at least one fluid operating machine is at least one of (a) released for a starting of the turbine power plant and (b) established on reaching a predetermined closing criterion.

15. The method according to claim 12, wherein a rotational speed of at least one of the (a) at least one fluid operating machine and (b) the drive shaft of the at least one fluid operating machine is adapted to a fluid working requirement of the pressurization device.

* * * * *